Aug. 17, 1926.
D. E. ROSS
1,596,025
REDUCING GEARING
Filed April 3, 1920
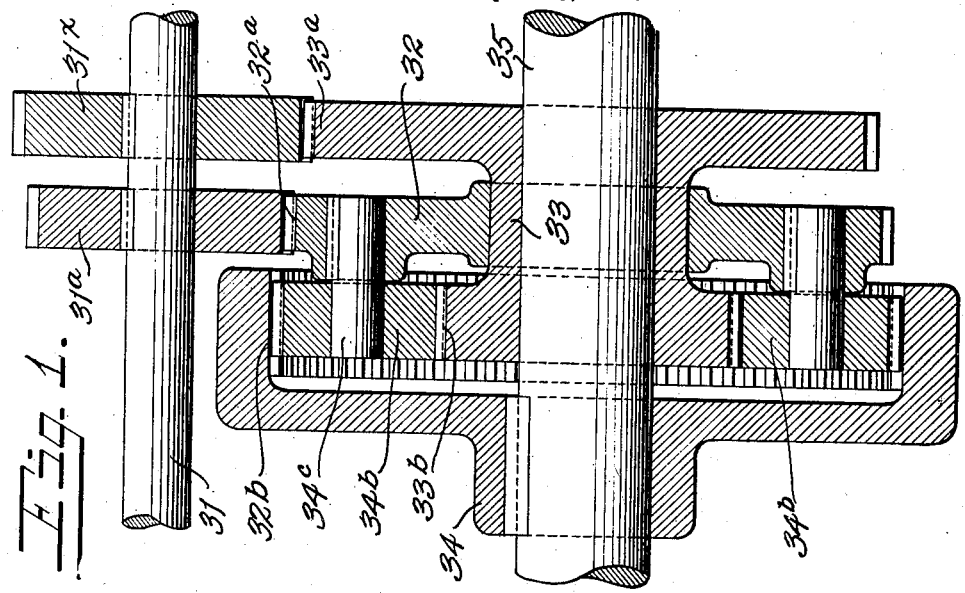
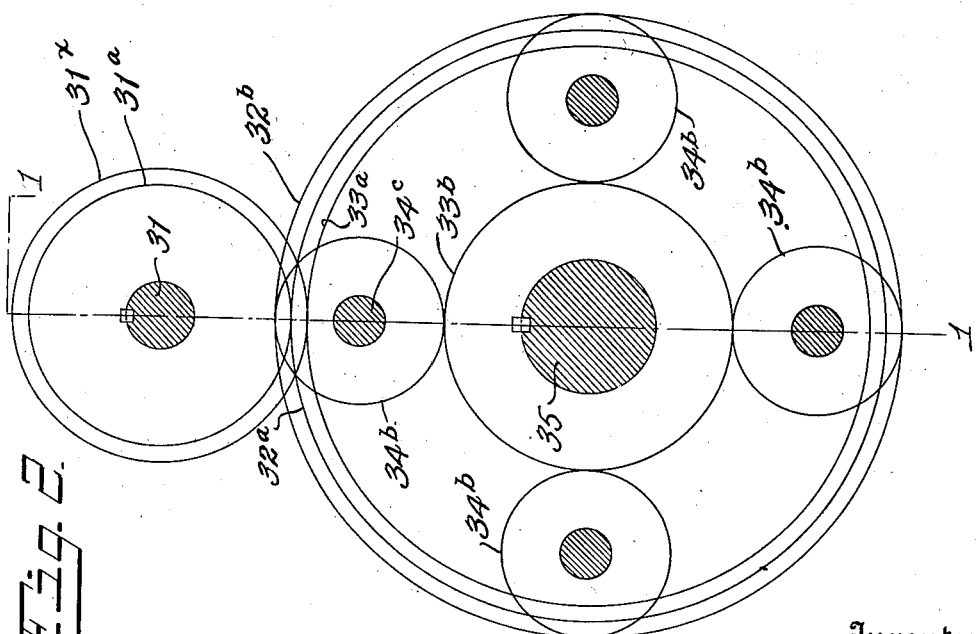
Inventor
David E. Ross
By Alexander & Dowell
Attorneys Patented Aug. 17, 1926.

1,596,025

UNITED STATES PATENT OFFICE.

DAVID E. ROSS, OF LA FAYETTE, INDIANA.

REDUCING GEARING.

Application filed April 3, 1920. Serial No. 370,905.

This invention relates to gearing for transmitting motion from a driving member (such as a shaft connected with, or driven by, an engine, or other suitable prime mover) to a driven member, which may be connected with a shaft to which power is to be imparted, for example, the driving axle of a motor vehicle.

The object of the invention is to provide a positive gear transmission between the driving and the driven members. The invention may be embodied in a number of variously appearing kinds and arrangements of gearing; but in each and every embodiment thereof there will be found five elemental parts; of which two (which I will call driving members) are positively driven by the prime mover at a definite fixed relative speed ratio; a third part (which I will call a driven member) may be formed on or separate from and connected with the parts to be driven; fourth part is a planetary gear or gears connecting the driven member with at least one of the driving members; and the fifth part is directly engaged with the planetary gears and may be formed with, or rigidly connected to and rotate with, the other driving member. Also in the embodiment of the invention the planetary gears will compensate for the difference in the speed ratios between the two driving members (definitely driven by the prime mover) and the planetary gears will impart to the driven member a corresponding movement.

I will explain the invention with reference to the accompanying drawings in which I have illustrated diagrammatically a set of transmission gears embodying the invention which will enable those skilled in the art to understand and comprehend the invention, and adapt and use the same; and the claims set forth the essentials of the invention which I desire to protect herein.

In said drawings:—

Fig. 1 is a longitudinal section on the line 1—1 Fig. 2, through a type of transmission gearing embodying my invention.

Fig. 2 is a diagrammatic view of the gearing shown in Fig. 1.

As shown, in Figs. 1 and 2, the prime mover shaft 31 carries pinions $31^a$ and $31^x$. The pinions $31^x$ mesh with a driving member or gear $33^a$ having a hub 33 loosely mounted on a shaft 35, which in this instance is the driven shaft, and the hub 33 has a smaller gear $33^b$ on its inner end, which gear $33^b$ meshes with planetary gears $34^b$ mounted on stub shafts $34^c$ attached to a driving gear 32, which is journaled on the hub 33 intermediate the gears $33^a$ and $33^b$, and has peripheral gear teeth $32^a$, which mesh with pinion $31^a$ on the prime mover shaft 31. The planetary gears $34^b$ mesh with an internal gear $32^b$ on a driven member 34 keyed to the driven shaft 35.

As shown, the driving members $32^a$, $33^a$, are rotated in the same direction by the pinions $31^a$ and $31^x$. Since the planetary gears $34^b$ are mounted upon the gear 32, the orbital movement of the planetary gears is always in the same direction of rotation as the gears 32, and $33^a$ or $33^b$. However since gear $33^a$ is smaller than gear 32 in the embodiment shown in Fig. 1, gear $33^a$ and hence gear $33^b$, will rotate faster than gear 32, and will thereby cause the planetary gears $34^b$ to rotate in the reverse direction to the driving gear 32, which is larger than the gear $33^b$; and the rapidity of rotation of said planetary gears is dependent upon the ratio of the gears 32 and $33^b$, and the relative speeds of rotation of such gears; and these obviously may be varied to suit the designer by changing the number of teeth and sizes of such gears. The planetary gears transmit motion according to their direction of rotation, through the annular gear $32^b$ to the driven member 34, and the latter to the driven shaft 35, in the manner above described. If, however the gear rotors were changed so that gear 32, carrying the planetary gears $34^b$, rotates faster than gear $33^a$ (and hence faster than gear $33^b$) then the direction of rotation of the planetary gears $34^b$ would be reversed, and they would rotate in the same direction as gear 32, and would therefore drive the gear $32^b$ in the reverse direction. Obviously, when the peripheral speeds of gears $32^a$ and $33^a$ are the same, the planetary gears $34^b$ will merely turn on their own axes, and the gear $32^b$ will come to rest.

There is a permanently fixed gear ratio between the prime mover shaft and the driven shaft, and the power transmitted is not dependent upon clutches, or frictional engagement of parts, and the speed of rotation of the driven member depends upon the difference in the relative speeds of the peripheries of the driving members; and relative speed of the driving members can be varied by varying their gear ratios.

As shown the two driving members $33^a$ and 32 are positively operated from the prime mover shaft 31; and the planetary gears 34$^b$ rotate in a direction according to whichever driving member 32 or 33$^a$ is moving faster; and by varying the ratio of the gearing the planetary gears can be caused to operate the driven member 32$^b$ at any desired speed forward, or to impart a reverse movement to the driven member; for the nearer the two rotating driving members approach the same peripheral speed the slower will be the rotation of the driven member, and if the driving members attain the same peripheral speed, the driven member will come to rest, the planetary gears then merely turning on their own axes.

By constructing a transmission gear in accordance with the principles above set forth, enormous reduction in speed of transmission between the prime mover shaft and the driven shaft may be obtained without having to use excessively small gears at any point; and without having to employ an excessively large number if teeth in the driving members, or other gears; and such transmission gearing can be made very compact; and any desired reduction of speed in transmission and consequent great enhancement of torque in transmission can be obtained by gearing occupying a very small space.

It will be further noted in each instance the second and the fifth elements (as above noted) are illustrated as formed integral, or rigidly united, and that one of these elements is directly geared to the prime mover, and driven thereby, and the other of these elements meshes with the planetary gears; so that in fact the second and fifth elements might be considered as one; but as they preferably have a different number of teeth I preferred for simplicity of explanation, to speak of them as if they were separate elements.

The reduction in speed between the driving element and the driven element can be varied by varying the relative speeds of rotation of the driving elements, and by varying the gear ratios of the said elements. Obviously this type of the invention could be embodied in gearing having plain gears, and could be embodied in gearing having bevel gearing, internal or external annular gears, worm gears, etc.; but in each and every instance there would be a permanent geared relation between the two driving members and the driven member.

Having described my invention, what I claim is:—

In transmission gearing, a driven shaft; an internal gear thereon; a driving gear journaled on said shaft, said driving gear having a hub extension; a second driving gear journaled on said hub extension; a planetary gear mounted on said second driving gear and meshing with the internal gear; a gear on said hub extension meshing with the planetary gear; a driving shaft parallel with the driven shaft; a pinion on said driving shaft meshing with the one driving gear; and a second pinion on said driving shaft meshing with the other driving gear; the gearing ratios between the respective pinions and driving gears being such that different speeds of rotation in the same direction are imparted to the driving gears.

In testimony that I claim the foregoing as my own, I affix my signature.

DAVID E. ROSS.